Figure 1:
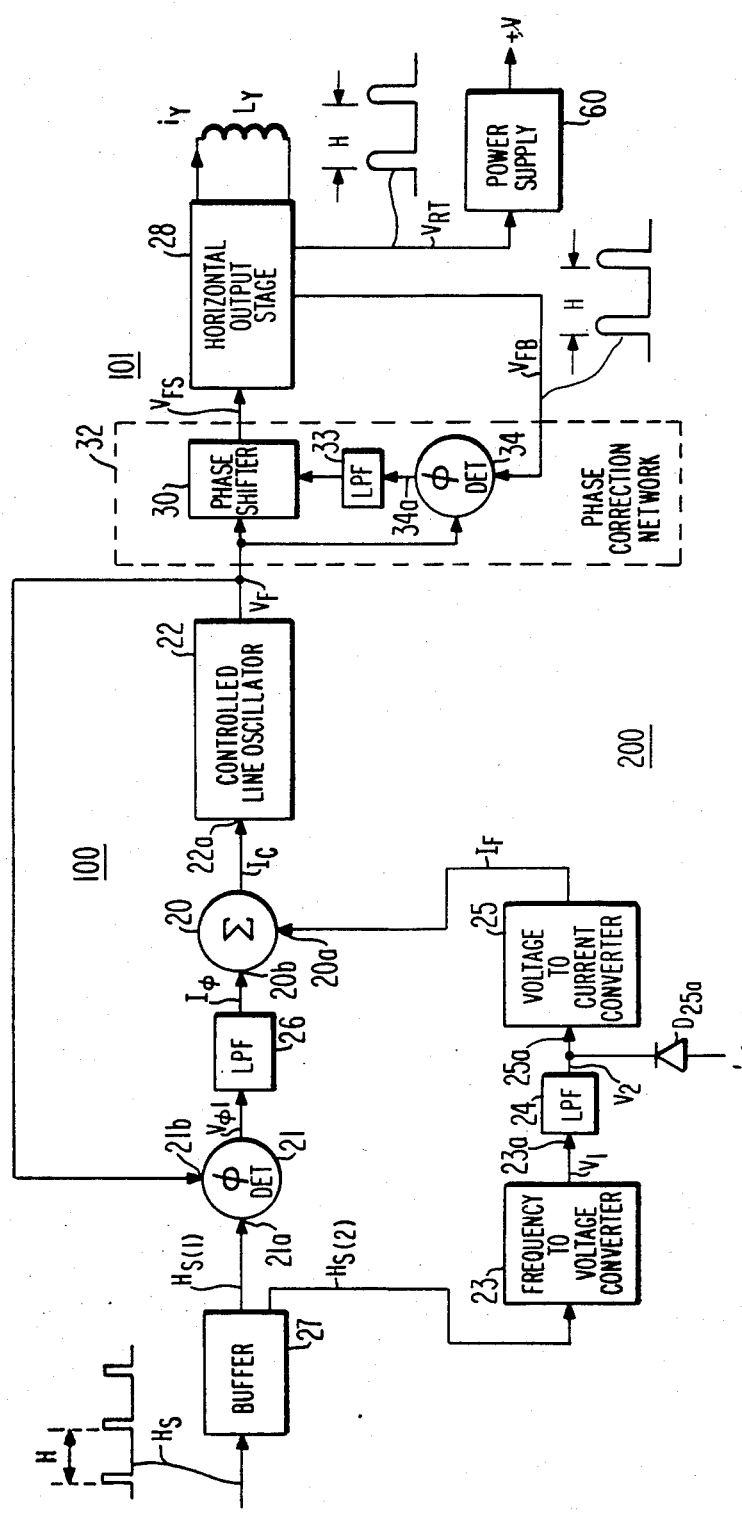

United States Patent [19]

Dietz

[11] Patent Number: 4,634,939

[45] Date of Patent: Jan. 6, 1987

[54] CIRCUIT SYNCHRONIZED BY A SIGNAL AT A DEFLECTION FREQUENCY

[75] Inventor: Wolfgang F. W. Dietz, New Hope, Pa.

[73] Assignee: RCA Corporation, Princeton, N.J.

[21] Appl. No.: 813,397

[22] Filed: Dec. 24, 1985

[51] Int. Cl.$^4$ .................. H01J 29/70; H01J 29/76
[52] U.S. Cl. .................. 315/399; 358/158; 358/159
[58] Field of Search .................. 315/370, 399; 358/158, 358/159

[56] References Cited

U.S. PATENT DOCUMENTS

| | | |
|---|---|---|
| 3,074,027 | 1/1963 | Rout . |
| 4,047,223 | 9/1977 | Hofmann .................. 358/159 |
| 4,467,359 | 8/1984 | Hosoya .................. 358/159 |

OTHER PUBLICATIONS

An application note No. 162 entitled LM2907 Tachometer/Speed Switch Building Block Applications in the name of Dave Long from National Semiconductor Corporation, dated Jun. 1976.
A data sheet for integrated circuit (IC) NE/SE5560, entitled Switched-Mode Power Supply Control Circuit, by Analog Division of Signetics Corporation, dated Jun. 1983.
A data sheet for IC TDA2595, entitled Horizontal Combination, appearing in pp. 3-737 to 3-745 of "Linear LSI Europroducts Data Manual", dated 1984.
A report entitled Sync Processor TDA 2595, dated 11/8/84.

Primary Examiner—Theodore M. Blum
Attorney, Agent, or Firm—Eugene M. Whitacre; Joseph J. Laks; Sammy S. Henig

[57] ABSTRACT

A phase-lock loop circuit of a video display apparatus is synchronized by a horizontal synchronizing input signal. The phase-lock loop circuit includes a frequency-to-voltage converter that is responsive to the synchronizing input signal for generating a control voltage indicative of the frequency of the synchronizing input signal. A voltage-to-current converter responsive to the control voltage generates a control current that is indicative of the frequency of the input signal. The control current varies the free running frequency of a controlled oscillator of the phase-lock loop circuit such that the free running frequency of the oscillator is directly related to the frequency of the input signal. The phase of the output signal of the oscillator is controlled by a second control current that is indicative of the phase difference between the oscillator output signal and the synchronizing input signal. When the frequency of the input signal is lower than a predetermined frequency, the first control current is at a level that causes the free running frequency to be above a predetermined minimum frequency.

13 Claims, 2 Drawing Figures

CIRCUIT SYNCHRONIZED BY A SIGNAL AT A DEFLECTION FREQUENCY

The invention is related to a video display apparatus that synchronizes a source of an output signal to a synchronizing input signal at a deflection frequency.

In, for example, a television monitor, a deflection current produced by a deflection circuit output stage is synchronized to the horizontal sync pulses that are derived, using a conventional sync separator, from the incoming television signal. Direct synchronization of the deflection oscillator from the sync pulses may not be desirable due to excessive tendency of the deflection current generated by the output stage to be affected by disturbances, caused by, for example, noise that is present in the sync pulses. Instead, a phase-locked loop (PLL) is typically used for eliminating such disturbances. A PLL of this kind may comprise a tunable oscillator and a phase discriminator with a downstream low-pass filter. The phase discriminator provides comparison of a certain assigned reference edge of the oscillator output signal with the sync pulse leading edge or center. A control voltage, or a control current, arising from the phase deviation is integrated in the low-pass filter and supplied to the oscillator as a DC voltage, or DC current, that varies the oscillator frequency and phase until the phase of the oscillator output signal and that of the corresponding sync pulse are the same. The remaining residual error depends on the control steepness or the loop gain.

It may be desirable that the response time of the PLL to phase, or frequency, variation of the sync pulses will not be too fast, in order to avoid scan line jitter due to disturbance caused by noise in the sync pulses. This is, typically, achieved by means of a relatively large time constant of the low-pass filter and a small total gain. However, such large filter reduces, by itself, the capture, or lock-in, range of the oscillator of the PLL. Such capture range is defined, for example, as the maximum difference between the oscillator free running frequency and the frequency of the synchronizing input signal that enables lock-in of the oscillator to the sync pulses. Moreover, to avoid unnecessary lengthening of the capture or lock-in time, it may be desirable to specify that the capture range be limited to substantially not more than the maximum necessary in view of the maximum difference between the frequency of the sync pulses and the free running frequency of the oscillator that is encountered in operation. Limitation of the capture range to the maximum necessary may be achieved, for example, by limitation of the maximum range of variation of the control current that controls the oscillator frequency.

Frequency variations of the sync pulses, that occur in the course of, for example, receiving an incoming television signal in a conventional television receiver, generally are small relative to the frequency of the sync pulses. Therefore, in such application, imposing a limitation on the maximum control range of the control current that controls the oscillator frequency does not pose a problem. However, in some other applications, such as in television monitors that are designed for receiving incoming signals having diverse sync frequencies, a given frequency of the sync pulses may be one that is selected from a possible wide span of frequencies. For example, the frequency of the sync pulses may be a frequency selected from a span of frequencies between 15,750 to 31,500 Hz. Therefore, a desirable narrow capture range that straddles, or lies, from a frequency that is below, to a frequency that is above, a fixed free running frequency of the oscillator, is not sufficiently wide to permit synchronizing the oscillator over the entire possible span of frequencies of the sync pulses.

In accordance with an aspect of the invention, a source of an output signal has a frequency that is controlled in accordance with a combined control current flowing at a control terminal of the source. The combined control current includes a first control current that is produced by a phase detector. The phase detector is responsive to the output signal and to a synchronizing input signal. The first control current controls the phase of the output signal in accordance with the phase of the input signal. A frequency-to-current converter that includes a frequency-to-voltage converter in responsive to the synchronizing input signal. The frequency-to-voltage converter generates a voltage that is indicative of the frequency of the synchronizing input signal. The voltage generated by the frequency-to-voltage converter is coupled to a voltage-to-current converter that generates a second control current that is indicative of the frequency of the synchronizing input signal.

In a circuit embodying the invention, the output signal is produced by an oscillator (OSC) of a PLL. When synchronized, the OSC oscillates at the horizontal frequency. The OSC output signal controls the timing of the deflection cycles formed by a deflection circuit output stage. The first control current signal that controls the frequency of the OSC is indicative of the phase difference between the horizontal sync pulses and the output signal of the OSC. Illustratively, the first control current signal synchronizes the phase of the output signal to coincide with the phase of the horizontal sync pulses. The second control current signal establishes the free running frequency of the OSC. A given capture range of the OSC corresponds with a given value of the second control current signal. The capture range may extend, for a given free running frequency of the OSC, from a frequency that is, a fraction of the horizontal frequency below, to a fraction of the horizontal frequency above such free running frequency. Thus the capture range is narrow relative to the free running frequency of the OSC.

The second control current signal can assume a value from a spread of values. Such value, advantageously, causes the free running frequency of the OSC to be approximately equal to the frequency of the sync pulses. Thus, the frequency of the sync pulses may be selected from a required wide span of frequencies. Such span of frequencies may lie, for example, between 15,750 and 31,500 Hz. Thus, the frequency of the sync pulses that may be selected from the wide span of frequencies may lie within the narrow capture range of the OSC that is established by the second control current signal.

The capture range associated with a given value of the second control current signal is substantially narrower than the entire span of frequencies, any value of which can be assumed by the sync pulses. It follows that a relatively narrow capture range is associated with each given frequency of the sync pulses. In this way, a short capture, or lock-in time of the OSC to the phase and frequency of the sync input signal is maintained. The second control current signal is capable of varying or shifting the capture range, illustratively, anywhere within the entire required span of frequencies, any of which may be assumed by the sync pulses. The second control current signal maintains the capture range relatively narrow by adjusting the free running frequency of the OSC to be approximately equal the frequency of the sync pulses.

The frequency detector may include a filter having a large time constant for, advantageously, eliminating noise from the second control current signal. Such filter that is responsive to the sync pulses is situated outside the feed-back loop of the PLL. Therefore, such filter, advantageously, does not affect the transient response to the PLL to phase variations of the sync pulses that do not amount to a steady state frequency change.

In accordance with yet another aspect of the invention, the voltage-to-current converter of the frequency detector includes a transistor that generates the second control current signal at the collector electrode of the transistor. The collector electrode of the transistor is coupled to the control terminal of the OSC for supplying the second control current signal that is combined at the control terminal with the first control current signal to provide the combined control current signal. The impedance at the collector electrode of the transistor is substantially higher than that at the control terminal. Therefore, advantageously, the transistor does not affect the impedance at the control terminal of the OSC. Moreover, because the transistor operates as a nearly ideal current source, the second control current signal, advantageously, is independent of the voltage at the control terminal.

In, for example, some television receivers, the retract pulses produced by the horizontal deflection circuit output stage are coupled to a power supply that produces therefrom an energizing voltage that energizes other circuits of the receiver. To prevent faulty modes of operation of such other circuits that may cause harm to such circuits and also to avoid possible harm to the deflection circuits, it may be desirable to maintain the frequency of the deflection current and that of the retrace pulses higher than a predetermined minimum frequency. Operation with a deflection frequency that is above such predetermined minimum frequency will prevent possible harm to some television circuits that may occur if the deflection frequency is lower.

In accordance with yet another aspect of the invention, the frequency of the OSC output signal is maintained above the predetermined minimum frequency even when the frequency of the sync pulses is lower. Thus, for example, when the incoming television signal is not received, the OSC output signal has a frequency that is maintained above the predetermined minimum frequency.

Figure 2:
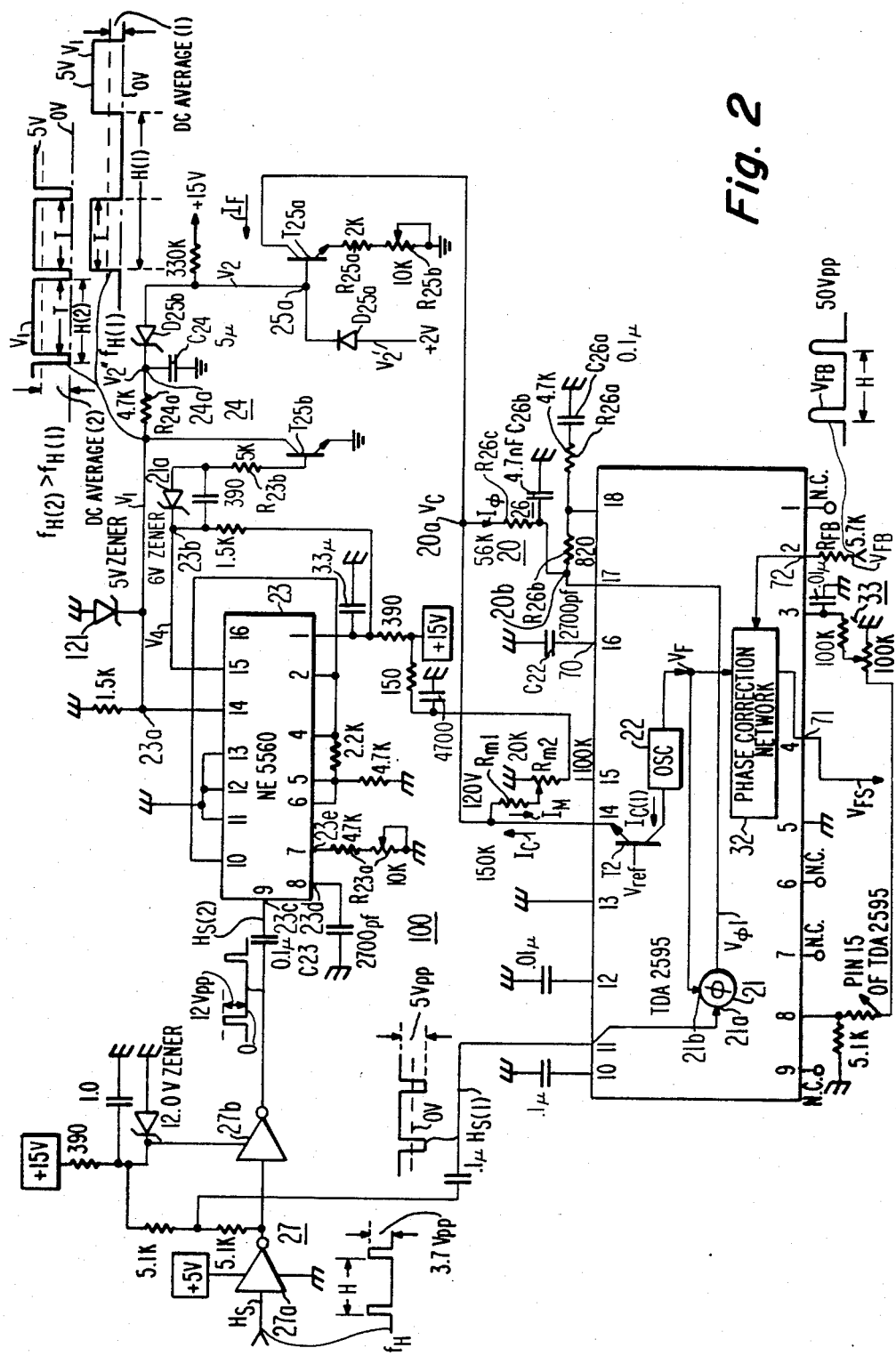

FIG. 1 illustrates a deflection circuit, embodying aspects of the invention, that includes a PLL synchronized to a horizontal sync input signal and that includes a phase-control loop circuit for synchronizing the deflection cycles produced by an output stage of the deflection circuit to the output signal of the PLL; and FIG. 2 illustrates a more detailed embodiment of the PLL synchronizing circuit of FIG. 1.

FIG. 1 illustrates a deflection circuit 200, embodying aspects of the invention, that includes a PLL 100 that generates a signal $V_F$ at a horizontal frequency $f_H$. Circuit 200 may be used in a television receiver to provide horizontal scanning. In steady state operation, signal $V_F$ is synchronized to a horizontal sync signal $H_S$ at the frequency $f_H$. Signal $V_F$ is coupled to a phase correction network 32 of a conventionally built phase-control loop circuit 101 that controls a horizontal output stage 28 by providing a phase reference to phase-control loop 101. Output stage 28 generates a deflection current $i_Y$ in a deflection winding $L_Y$.

Output stage 28 also generates a retract signal $V_{RT}$ that is coupled to a power supply 60 that is, illustratively, a switched mode power supply, operating at the frequency of signal $V_{RT}$. Power supply 60 produces a DC voltage $+V$. Voltage $+V$ is used for energizing other circuitry of the television receiver that are not shown in FIG. 1. A conventionally generated retrace pulse signal $V_{FB}$, produced by output stage 28, provides the actual phase of deflection current $i_Y$. Phase-control loop circuit 101 synchronizes signal $V_{FB}$, as well as deflection current $i_Y$, to signal $V_F$. Phase correction network 22 includes a phase detector 34 that generates a phase difference representative signal 34a from signals $V_F$ and $V_{FB}$. Signal 34a controls the extent of phase shifting of a phase shifter 30. Phase shifter 30 shifts the phase of signal $V_F$ for producing at its output terminal a horizontal rate signal $V_{FS}$ that is phase shifted relative to signal $V_F$ and that controls the timing of deflection current $i_Y$ produced by output stage 28. Signal $V_{FS}$ causes deflection current $i_Y$ to be, illustratively, in-phase with signal $V_F$.

The tracking response time, in phase-control loop circuit 101, with respect to phase variations of retract signal $V_{FB}$ is faster than the corresponding tracking response, in PLL 100, with respect to phase variations of synchronizing input signal $H_S$ that contains the sync pulses. This is so, because phase-control loop circuit 101 is optimized to accommodate fast switching time variations in horizontal output stage 28 that may occur, illustratively, when fast changing electron beam current occurs; whereas PLL circuit 100 is optimized to reject noise or jitter accompanying sync signal $H_S$.

Sync signal $H_S$ is coupled to a buffer 27 that produces a signal $H_{S(1)}$ that is coupled to a phase detector 21, and a signal $H_{S(2)}$ that is coupled to a frequency-to-voltage converter 23. Each of signals $H_{S(1)}$ and $H_{S(2)}$ has an, illustratively, rectangular waveform. The transition times in each of signals $H_{S(1)}$ and $H_{S(2)}$ follow closely the transition times in signal $H_S$, respectively.

A frequency-to-voltage converter 23 generates a signal $V_1$ that is indicative of the frequency of each of signals $H_{S(1)}$, $H_{S(2)}$ and $H_S$. Signal $V_1$ is coupled through a lowpass filter 24 to provide a low-pass-filtered signal $V_2$ at an input terminal 25a of a voltage-to-current converter 25. Lowpass filter 24 filters out from signal $V_2$ component signals at the vertical frequency and above. A diode $D_{25a}$ couples a voltage $V_2'$ to terminal 25a so as to prevent signal $V_2$ from being below a predetermined level of, illustratively, 1.3 volts. By maintaining signal $V_2$ above such level, the frequency of signal $V_F$ cannot go below a corresponding predetermined minimum frequency, as described later on. Operation below such predetermined minimum frequency could have harmed, for example, television circuits that are energized from voltage $+V$ of FIG. 1, as described later on.

Voltage-to-current converter 25 generates a current signal $I_F$ that is indicative of the frequency of signal $H_S$. Current signal $I_F$ is coupled to an input terminal 20a of a summer 20 that generates, at an output terminal 22a, a combined current signal $I_C$ that controls the frequency of an oscillator 22. A current signal $I_\phi$, as described later on, is coupled to a second input terminal, terminal 20b, of summer 20. Combined current signal $I_C$ at terminal 22a is indicative of the sum of current signals $I_\phi$ and $I_F$.

Output signal $V_F$ of OSC 22 is coupled to a terminal 21b of a phase detector 21. Phase detector 21 receives, at a terminal 21a, signal $H_{S(1)}$. Phase detector 21 generates a signal $V_{\phi 1}$ that is representative of the phase difference between signals $H_S$ and output signal $V_F$ of OSC 22. Signal $V_{\phi 1}$ is coupled through a low-pass filter 26 that comprises the loop filter of PLL 100 to provide current signal $I_\phi$ at terminal 20b of summer 20, as described before. Thus, PLL 100 includes phase detector 21, low-pass filter 26 and OSC 22.

The free running frequency of OSC 22 is defined, illustratively, as the frequency of signal $V_F$ of OSC 22 when signal $I_\phi$ is zero. Because of the summation operation of summer 20, current signal $I_F$ that is included in combined current signal $I_C$ determines the free running frequency of OSC 22. For a given frequency of synchronizing signal $H_S$, current signal $I_F$ causes OSC 22 to oscillate at a frequency that is approximately equal to that of signal $H_S$. In steady state operation, current signal $I_\phi$ assumes such a value that, for a given frequency of signal $H_S$, causes the frequency and phase of signal $V_F$ of OSC 22 and of signal $H_S$ to be the same.

Illustratively, the frequency of signal $H_S$ is 15,750 Hz, the horizontal frequency in an NTSC standard. Current signal $I_F$ permits the frequency of signal $V_F$ of OSC 22 to vary from, illustratively, 15,750 Hz minus a small fraction of 15,750 Hz to 15,750 Hz plus a small fraction of 15,750 Hz, when current signal $I_\phi$ varies between a possible minimum value to a possible maximum value of signal $I_\phi$, respectively. In another example, when the frequency of signal $H_S$ is 31,500 Hz, the frequency of signal $V_F$ of OSC 22 can vary from 31,500 Hz minus a small fraction of 31,500 Hz to 31,500 Hz plus a small fraction of 31,500 Hz. Since each of such fractions is relatively small, the capture range and the capture time are, advantageously, maintained low. The capture range associated with signal $H_S$ at, for example, 15,750 Hz, need not overlap the capture range associated with signal $H_S$ at, for example, 31,500 Hz. Thus, advantageously, the entire span of frequencies, any of which may be assumed by signal $H_S$ for synchronizing OSC 22 output signal $V_F$, may be substantially larger than the capture range that is associated with any given free running frequency of OSC 22.

In accordance with a further aspect of the invention, in the event that the frequency of signal $H_S$ is not higher than a predetermined minimum frequency, voltage $V_2'$ causes the flow of current $I_F$ of such magnitude that maintains the frequency of OSC 22 output signal $V_F$ above the predetermined minimum frequency regardless of the frequency of signal $H_S$. Switched mode power supply 60 of FIG. 1, that requires for normal operation retrace signal $V_{RT}$ at a frequency that is above such minimum frequency, might operate improperly if the frequency of signal $V_{RT}$ is too low. Also, the deflection circuits of the television that are not shown in FIG. 1 might be harmed if the deflection frequency is too low. Therefore, establishing, such minimum frequency to the frequency of signal $V_F$ is advantageous in order to prevent harm to some television receiver circuits that are not shown in the figures.

FIG. 2, embodying aspects of the invention, illustrates a detailed embodiment of PLL 100 of FIG. 1. Similar numbers and symbols in FIGS. 1 and 2 represent similar items or functions. In FIG. 2, signal $H_S$ is coupled through buffer 27 that includes an inverter 27a that feeds an inverter 27b to produce signal $H_{S(2)}$ at a terminal 23c of frequency-to-voltage converter 23. Converter 23 is realized, in the embodiment of FIG. 2, using control circuit NE5560 manufactured by the Analog Division of Signetics Corporation, Sunnyvale, Calif. Converter 23 generates, at a terminal 23a, a rectangular positive voltage pulse of signal $V_1$ that is actively driven from terminal 23a of converter 23 each time the leading edge of the corresponding sync pulse of signal $H_{S(2)}$ occurs at terminal 23c. The pulse width, T, of each pulse of signal $V_1$ has a duration that is substantially independent of the frequency of signal $H_{S(2)}$. However, the period between successive pulses of signal $V_1$ is equal to the period between the corresponding successive pulses of signal $H_{S(2)}$. Therefore, the duty cycle of the pulses of signal $V_1$ is directly related to the frequency of signal $H_{S(2)}$. When the pulse of voltage $V_1$ is not present, signal $V_1$ is at approximately zero volts, as described later on. The positive, substantially flat level, of each pulse of signal $V_1$ has a value that is controlled by the clamping operation of a Zener diode 121 that is coupled between terminal 23a and ground. When the pulse of signal $V_1$ does not occur, terminal 23a of converter 23 is not driven by converter 23, and the impedance formed by converter 23 at terminal 23a is high.

The pulse width, T, of each positive pulse of signal $V_1$ is predetermined by a capacitor $C_{23}$ that is coupled between a terminal 23d and ground and by a manually adjustable resistor network $R_{23a}$ that is coupled between a terminal 23e and ground. The DC component voltage, or the average value, of signal $V_1$ that varies in accordance with the duty cycle of the pulses of signal $V_1$ is directly related to the frequency of signal $H_{S(2)}$. The higher the frequency of signal $H_{S(2)}$, the higher is the value of the DC component, or average, of signal $V_1$. The pulse width, T, determines the frequency detection upper limit. Above such upper limit, the duty cycle of signal $V_1$ does not increase when the frequency of the synchronizing input signal $H_S$ increases.

Signal $V_1$ is coupled to the base electrode of a transistor $T_{25a}$ through low-pass filter 24 that includes a resistor $R_{24a}$. A filter capacitor $C_{24}$ is coupled between ground and a terminal 24a of resistor $R_{24a}$ that is remote from terminal 23a. Capacitor $C_{24}$ provides the filtering capacitance of filter 24. The DC level of a signal $V_2''$ at terminal 24a is proportional to the frequency of signal $H_S$. Terminal 24a is coupled to the cathode of a diode $D_{25b}$. The anode of diode $D_{25b}$, at terminal 25a, is coupled to the base electrode of transistor $T_{25a}$ to form signal $V_2$ at the base electrode of transistor $T_{25a}$ that is proportional to the frequency of signal $H_S$. Diode $D_{25b}$ provides $-0.7$ volts DC level shifting to the voltage at terminal 24a. The cathode of diode $D_{25a}$ is coupled to terminal 25a. The anode of diode $D_{25a}$ is coupled to a clamping voltage $V_2'$ that causes signal $V_2$ to assume a level of 1.3 volts when voltage $V_2''$ at terminal 24a is lower than a predetermined voltage. Voltage $V_2''$ is lower than such predetermined voltage when the frequency of synchronizing signal $H_S$ is lower than a corresponding predetermined minimum deflection frequency that is required for normal operation, as described before. Illustratively, when a composite television signal, not shown in the figures, that is used for generating signal $H_S$, is absent, the voltage of signal $V_2$ is clamped to 1.3 volts by voltage $V_2'$.

The voltage of signal $V_2$ that is developed at terminal 25a is the base voltage of transistor $T_{25a}$ of voltage-to-current converter 25. The emitter electrode of transistor $T_{25a}$ is coupled to ground through a resistor $R_{25a}$ that is in series with an adjustable resistor $R_{25b}$. Resistors $R_{25a}$ and $R_{25b}$ control the voltage-to-current conversion ratio, defined as the ratio between output current signal $I_F$ and the voltage of signal $V_2$. Such conversion ratio is manually adjustable by, for example, manually adjusting resistor $R_{25b}$. Collector current signal $I_F$ of transistor $T_{25a}$ is representative of the level of signal $V_2$ and therefore indicative of the frequency of signal $H_S$. Diode $D_{25b}$ tracks temperature related changes in the base-emitter junction of transistor $T_{25a}$ to provide temperature compensation for corresponding changes in the base-emitter voltage of transistor $T_{25a}$. In this way, current signal $I_F$ is made substantially independent of temperature variations. Current signal $I_F$ at the collector electrode of transistor $T_{25a}$ is coupled to input terminal 20a of summer 20.

In some television application, synchronizing signal $H_{S(2)}$ may not contain horizontal sync pulses during vertical retrace. Therefore, signal $V_1$ of converter 23 may not have the waveform that is required for normal operation. To prevent significant changes, or disturbance, of signal $V_2''$ across capacitor $C_{24}$, resulting from the missing horizontal sync pulses in signal $H_{S(2)}$ during vertical retrace, it may be desirable to utilize capacitor $C_{24}$ that has a large capacitance that maintains signal $V_2''$ relatively constant during such disturbance. Such disturbance in signal $V_2''$ might have caused corresponding transient variation in the frequency of signal $V_{FSY}$ of FIG. 1 at the beginning of vertical trace.

The cathode of a Zener diode 21a is coupled to an output terminal 23b of converter 23. The anode of diode 21a is coupled to the base electrode of a transistor $T_{25b}$. The emitter of transistor $T_{25b}$ is coupled to ground. The collector electrode of transistor $T_{25b}$ is coupled to terminal 23a.

When the positive pulse of signal $V_1$ occurs, frequency-to-voltage converter 23 generates, at terminal 23b, a signal $V_4$ that is at a level not sufficiently positive to cause reverse conduction in Zener diode 21a. Therefore, transistor $T_{25b}$ is not supplied with a base current. On the other hand, when such positive pulse of signal $V_1$ does not occur, signal $V_4$ generated in converter 23 is at a level that is sufficiently positive to cause reverse conduction in diode 21a. Therefore, transistor $T_{25b}$ is supplied with base current that is sufficient to turn-on transistor $T_{25b}$ that operates as a switch. Thus, transistor $T_{25b}$ operates as a switch that is conductive when signal $V_4$ causes Zener diode 21a to conduct. When the positive pulse of signal $V_1$ occurs, signal $V_4$ is too low to develop across diode 21a a voltage that exceeds its breakdown voltage. Therefore, transistor $T_{25b}$ is nonconductive and has not effect on signal $V_1$. When the positive pulse of signal $V_1$ does not occur, conductive transistor $T_{25b}$ causes signal $V_1$ at terminal 23a of converter 23, to be at zero volts, even though terminal 23a is not driven then by converter 23. In this way, for a given frequency of signal $H_{S(2)}$ the peak-to-peak amplitude of the positive pulse of signal $V_1$ is equal to the breakdown voltage of Zener diode 121.

PLL 100 also includes a sync processor TDA 2595 manufactured by the Linear LSI Product Division of Signetics Corporation, Sunnyvale, CA. Processor TDA 2595 receives at a terminal 21a sync signal $H_{S(1)}$ that is coupled from buffer 27a. Thus, signal $H_{S(1)}$ is coupled in processor TDA 2595 to input terminal 21a of phase detector 21 that is included in TDA 2595. OSC 22 that is included in processor TDA 2595 produces signal $V_F$ that is coupled to terminal 21b of phase detector 21. Signal $V_{\phi 1}$, at the output terminal of detector 21, is coupled to an output terminal 20b of processor TDA 2595. Terminal 20b of processor TDA 2595 is coupled to low-pass filter 26. Filter 26 includes an arrangement of a resistor $R_{26b}$, a resistor $R_{26a}$ and a capacitor $C_{26a}$ that are coupled in series between terminal 20b and ground. Terminal 20b is coupled to the plate of a filter capacitor $C_{26b}$ of filter 26 that filters out high frequencies. The other plate of capacitor $C_{26b}$ is coupled to ground. A resistor $R_{26c}$ is coupled between terminal 20b and terminal 20a that is coupled to the collector electrode of transistor $T_{25a}$. Current signal $I_\phi$, developed by resistor $R_{26c}$ from the voltage at terminal 20b, is indicative of the phase difference between signal $V_F$ of OSC 22 and signal $H_S$.

A current signal $I_M$ that is adjusted by manually adjusting an adjustable resistor $R_{m2}$ is also summed up in terminal 20a. Current signal $I_M$ is adjusted for improving the linearity of voltage-to-current converter 25. Current signal $I_M$ flows in a resistor $R_{m1}$ that is coupled to adjustable resistor $R_{m2}$. Terminal 20a of summer 20 operates both as an input terminal for current signal $I_F$ and as a current summing junction for summing current signals $I_F$, $I_\phi$ and $I_M$ to form OSC 22 combined control current signal $I_C$. Terminal 20a that operates as current summing junction, advantageously, simplifies the frequency and phase control of OSC 22 that is controlled from such three sources. The impedance at terminal 20a that is attributable to transistor $T_{25a}$ is high. Therefore, transistor $T_{25a}$ is capable of providing current signal $I_F$ that may, advantageously, assume a value from a wide range of values without affecting the impedance at terminal 20a.

Combined current signal $I_C$ is coupled to the emitter electrode of a transistor T2 that is included in processor TDA 2595. The base electrode of transistor T2 is coupled to a DC voltage $V_{ref}$ that is generated internally in processor TDA 2595. The common base configuration of transistor T2 causes the voltage at terminal 20a to be substantially the same for a wide range of values of combined current signal $I_C$. The collector electrode of transistor T2 is coupled to OSC 22 for controlling the frequency of OSC 22, in accordance with the value of a current signal $I_{C(1)}$ flowing in the collector electrode of transistor T2 that is substantially equal to current signal $I_C$. Because transistor T2 operates as a common base transistor, the impedance between the emitter electrode of transistor T2 at terminal 20a and ground is low. Thus, combined current signal $I_C$, that flows out of the emitter electrode of transistor T2, controls the frequency of OSC 22 without affecting the voltage at terminal 20a.

In accordance with a further aspect of the invention, when the frequency of signal $H_s$ is lower than a predetermined frequency, and also when signal $H_s$ does not contain synchronization information, voltage $V_2'$ causes current signal $I_F$ to be at a level that maintains the free running frequency of OSC 22 at a frequency that is above a predetermined minimum frequency.

Both current signal $I_M$, that is manually adjustable, and current signal $I_F$, that are included in combined current signal $I_C$, control the free running frequency of OSC 22; whereas current signal $I_\phi$ adjusts the phase and frequency of signal $V_F$ of OSC 22 within the capture range of OSC 22. The capture range of OSC 22 may be within a range of frequencies that is substantially smaller than the span of the frequency, any of which may be selected by current signals $I_F$ and $I_M$ to be the free running frequency of OSC 22. Thus a given value of, for example, current signal $I_F$ also determines the frequencies that are included in the corresponding capture range associated with the corresponding free running frequency of OSC 22. A capacitor $C_{22}$ that is coupled between a terminal 70 of processor TDA 2595 and ground determines the highest attainable frequency of OSC 22 signal $V_F$ associated with a given set of values of current signals $I_M$ and $I_F$.

Output signal $V_F$ of OSC 22 is coupled to phase correction network 32 that is included in processor TDA 2595 and that generates signal $V_{FS}$ at a terminal 71 of processor TDA 2595. Retrace signal $V_{FB}$ is coupled to a terminal 72 of processor TDA 2595 through a resistor $R_{FB}$. As described before, retrace signal $V_{FB}$ contains the phase information of deflection current $i_Y$ of FIG. 1. The phase of signal $V_{FS}$ of FIG. 2 is adjusted automatically by network 32, in a conventional manner, such that the phase difference, or delay time, between deflection current $i_Y$ of FIG. 1 and signal $V_F$ of FIG. 2 becomes independent of delay variations in output stage 28 of FIG. 1. Such delay variations occur, illustratively, when the beam current in a cathode ray tube, not shown in the figures, changes, because of a corresponding change in the corresponding video signal.

What is claimed:

1. A video display deflection apparatus responsive to a synchronizing input signal that contains synchronizing phase information for generating a deflection current that is synchronized to said input signal, comprising:
    a source of an output signal at a controllable phase;
    a phase detector responsive to said synchronizing input and output signals for generating in a first terminal a first control current that is coupled to said source to control the phase of said output signal in accordance with the phase of said input signal;
    a frequency-to-voltage converter responsive to said synchronizing input signal for generating a voltage that is indicative of the frequency of said synchronizing input signal;
    a voltage-to-current converter configured as a current source and responsive to said voltage that is generated by said frequency-to-voltage converter for generating in a second terminal a second control current that is indicative of the frequency of said synchronizing input signal and that is independent of the voltage at said second terminal;
    means coupled to said first and second terminals for combining said first and second control currents that produce a combined current that is coupled to a control terminal of said source for controlling in accordance with said combined current the frequency of said output signal; and
    a deflection circuit output stage responsive to said output signal for generating said deflection current.

2. A video display apparatus responsive to a deflection rate related synchronizing input signal that contains synchronizing phase information for generating an output signal that is synchronized to said input signal, comprising:
    a current controlled oscillator for producing an output signal at a controllable phase;
    a phase detector responsive to said synchronizing input and output signals for generating in a first terminal a first control current that is indicative of the phase difference therebetween;
    a frequency-to-voltage converter responsive to said synchronizing input signal for generating a voltage that is indicative of the frequency of said synchronizing input signal;
    a voltage-to-current converter configured as a current source and responsive to said voltage that is generated by said frequency-to-voltage converter for generating in a second terminal a second control current that is indicative of the frequency of said synchronizing input signal and that is independent of the voltage at said second terminal; and
    means coupled to said first and second terminals for combining said first and second control currents to produce a combined control current that is coupled to a control terminal of said oscillator for controlling in accordance with said combined control current the frequency of said output signal.

3. A video display apparatus according to claim 2, further comprising, means responsive to said input signal and coupled to said voltage-to-current converter for establishing said second control current at a predetermined level independent of the frequency of said input signal when the frequency of said input signal is lower than a first predetermined frequency.

4. A video display apparatus according to claim 2, wherein said frequency-to-voltage converter establishes said second control current at a predetermined level independent of the frequency of said input signal when the frequency of said input signal is higher than a first predetermined frequency.

5. A video display apparatus according to claim 4, further comprising, means responsive to said input signal and coupled to said voltage-to-current converter for establishing said second control current at a predetermined level independent of the frequency of said input signal when the frequency of said input signal is lower than a second predetermined frequency.

6. A video display apparatus according to claim 4 wherein said frequency-to-voltage converter generates a control signal having a duty cycle that varies as the frequency of said input signal varies, such that said duty cycle is independent of the frequency of said input signal when the frequency of said input signal is higher than said first predetermined frequency.

7. A video display apparatus according to claim 2 wherein said frequency-to-voltage converter comprises means responsive to said synchronizing input signal for generating a pulsed third signal having a duty cycle that varies when the frequency of said synchronizing input signal varies.

8. A video display apparatus according to claim 7 wherein said third signal generating means generates said third signal such that the width of a given pulse of said third signal is independent of the frequency of said synchronizing input signal.

9. A video display apparatus responsive to a deflection rate related synchronizing input signal that contains synchronizing phase information for generating an output signal that is synchronized to said input signal, comprising:
    an oscillator for producing an output signal at a controllable phase;
    a phase detector responsive to said synchronizing input and output signals for generating a first control signal that is indicative of the phase difference therebetween, said first control signal being coupled to said oscillator to control the phase of said output signal;
    means responsive to said synchronizing input signal for generating a second control signal that is indicative of the frequency of said synchronizing input signal and that varies when the frequency of said input signal varies, said second control signal being coupled to said oscillator to control the free running frequency thereof; and means coupled to said second control signal generating means for establishing said second control signal at a level that is independent of the frequency of said synchronizing input signal when the frequency of said synchronizing input signal is lower than a predetermined frequency.

10. A video display apparatus according to claim 9 wherein said means that establishes said second control signal at said level that is independent of the frequency of said synchronizing input signal comprises a source of a third signal and switching means that couples said third signal to a signal line that provides said second control signal when the frequency of said synchronizing input signal is lower than said predetermined frequency.

11. A video display apparatus according to claim 10 wherein said switching means comprises a diode that is conductive when the frequency of said synchronizing input signal is lower than said predetermined frequency.

12. A video display deflection apparatus responsive to a synchronizing input signal that contains synchronizing phase information for generating a deflection current that is synchronized to said input signal, comprising:

a frequency-to-voltage converter responsive to said synchronizing input signal for generating a first control signal that is indicative of the frequency of said synchronizing input signal;

a controllable oscillator for generating an output signal at a controllable phase, said oscillator being responsive to said first control signal that determines the free running frequency of said oscillator when the frequency of said input signal is between first and second predetermined frequencies;

means coupled to said first control signal generating means for establishing said first control signal at a first level that is not affected by variation of the frequency of said input signal when the frequency of said input signal is lower than said first predetermined frequency;

a phase detector responsive to said synchronizing input and output signals for generating a second control signal that is coupled to said oscillator to vary the phase of said output signal in accordance with the phase of said input signal; and a deflection circuit output stage responsive to said output signal for generating said deflection current.

13. A video display deflection apparatus according to claim 12 wherein said frequency-to-voltage converter generates a third control signal having a duty cycle that varies as the frequency of said input signal varies, such that said duty cycle is independent of the frequency of said input signal when the frequency of said input signal is higher than said second predetermined frequency.

* * * * *